(12) United States Patent
Vasana

(10) Patent No.: US 7,469,023 B2
(45) Date of Patent: Dec. 23, 2008

(54) MANCHESTER CODE DELTA DETECTOR

(76) Inventor: Susan Vasana, 8358 Warlin Drive South, Jacksonville, FL (US) 32216

( * ) Notice: Subject to any disclaimer, the term of this patent is extended or adjusted under 35 U.S.C. 154(b) by 745 days.

(21) Appl. No.: 10/654,321

(22) Filed: Sep. 3, 2003

(65) Prior Publication Data

US 2004/0247051 A1    Dec. 9, 2004

Related U.S. Application Data

(60) Provisional application No. 60/475,864, filed on Jun. 4, 2003.

(51) Int. Cl.
*H04L 27/06* (2006.01)
(52) U.S. Cl. .................................... 375/342
(58) Field of Classification Search ................ 375/282, 375/361, 325, 333, 359, 360, 324, 326, 340, 375/342
See application file for complete search history.

(56) References Cited

U.S. PATENT DOCUMENTS

| | | | |
|---|---|---|---|
| 3,361,978 A | 1/1968 | Fiorini | |
| 3,391,344 A | 7/1968 | Goldberg | |
| 3,626,298 A * | 12/1971 | Paine et al. ................ | 375/359 |
| 3,789,303 A | 1/1974 | Hoffman et al. | |
| 4,080,572 A | 3/1978 | Hastings et al. | |
| 4,188,620 A | 2/1980 | Lamare et al. | |
| 4,302,485 A | 11/1981 | Last et al. | |
| 4,317,211 A | 2/1982 | Quesnell, Jr. | |
| 4,361,895 A | 11/1982 | Khoudari | |
| 4,507,794 A | 3/1985 | Jones et al. | |
| 4,596,011 A * | 6/1986 | Kobayashi et al. .......... | 370/445 |
| 4,603,322 A | 7/1986 | Blair | |
| 4,627,079 A | 12/1986 | Von der Embse | |
| 4,680,554 A | 7/1987 | Roberge | |
| 4,788,695 A * | 11/1988 | Iverson et al. ............... | 375/325 |
| 4,853,943 A | 8/1989 | Laws | |
| 4,862,482 A | 8/1989 | Patchen | |
| 4,881,059 A | 11/1989 | Saltzberg | |
| 5,023,891 A | 6/1991 | Johnson, III | |
| 5,081,644 A | 1/1992 | Uchida et al. | |
| 5,170,396 A | 12/1992 | Rivers et al. | |
| 5,185,765 A * | 2/1993 | Walker ....................... | 375/238 |
| 5,452,331 A * | 9/1995 | Shihabi et al. ............... | 375/324 |
| 5,490,175 A | 2/1996 | Alameh et al. | |
| 5,566,212 A | 10/1996 | Boytim et al. | |
| 5,758,277 A * | 5/1998 | Hawkes ..................... | 455/410 |
| 6,008,746 A | 12/1999 | White | |
| 6,091,531 A | 7/2000 | Schwartz et al. | |
| 6,128,112 A | 10/2000 | Harres | |
| 6,370,212 B1 | 4/2002 | Nakai | |
| 6,885,716 B1 * | 4/2005 | Zalud et al. ................. | 375/361 |

* cited by examiner

*Primary Examiner*—Don N Vo
(74) *Attorney, Agent, or Firm*—Thomas C. Saitta

(57) ABSTRACT

A biphase code detector and method for implementing the same. In accordance with one embodiment, the biphase code detector includes a receiver input for receiving a biphase encoded signal. The biphase encoded signal is a stream of unit bit cells each having a logic value encoded as a mid-bit transition between a first half-symbol signal component and a second half-symbol signal component. An integrated value is produced for the first and the second half-symbol components of a received unit bit cell. The biphase code detector further includes a delta detector that generates a difference signal corresponding to the difference between the integrated values of the first and second half-symbol components to determine the logic value of the received unit bit cell.

21 Claims, 3 Drawing Sheets

MANCHESTER CODE DELTA DETECTOR

CROSS REFERENCE TO RELATED APPLICATIONS

This application claims the benefit of U.S. Provisional Application Ser. No. 60/475,864, entitled "MANCHESTER DELTA DETECTOR," and filed on Jun. 4, 2003, the contents of which are incorporated herein by reference.

BACKGROUND OF THE INVENTION

1. Technical Field

The present invention relates generally to digital communications protocols and in particular to biphase encoded signals that encode data utilizing signal transitions within bit cells. More particularly, the present invention relates to a device and method for detecting transition-encoded signals in which the transition within each bit cell occurs at the approximate midpoint of the bit cell. Still more particularly, the present invention relates to an improved Manchester code detector and method for implementing the same that processes both halves of a bit cell signal to determine the value of the received transition-encoded bit cell.

2. Description of the Related Art

Biphase codes are widely utilized for digital data transmission including pulse coded modulation (PCM) transmission. A common form of biphase code, known as Manchester code, has been specified for the IEEE 802.3 standard for baseband coaxial cable and twisted-pair Carrier Sense Multiple Access/Collision Detection (CSMA/CD) bus LANs. Manchester encoding has also been used in air interface applications such as Wireless Local Access Network (WLAN) specified by the IEEE 802.11 and 802.15.4 standards.

Manchester encoding, named for the University of Manchester, where its first recorded use occurred in the late 1940's, is widely utilized to provide clock and data information simultaneously via a single connection. Manchester encoding is a synchronous digital encoding technique utilized by the Open System Interconnection (OSI) physical layer to encode the clock and data of a synchronous bit stream. A description of the characteristics and nature defining Manchester codes, alternatively referred to as biphase codes, is presented in Stallings, *Data and Computer Communications*, $3^{rd}$ Ed., pp. 90-92, the substance of which is incorporated herein by reference.

Manchester encoding is fundamentally distinguished from other digital encoding techniques in that the actual logic values embodying binary data to be transmitted over the cable or air-interface are not delivered as a sequence of signal levels, but are instead encoded as mid-bit signal transitions. Several types of such mid-bit signal transitions are possible depending on the modulation technique employed for transmission. For example, if the bit stream is amplitude modulated, the direction of a mid-bit transition between a first half-bit interval having a first amplitude and the subsequent second half-bit interval having a second amplitude determines the value of the bit cell. If the bit stream is frequency modulated, the bit cell logic value is determined by a mid-bit shift in frequency, and similarly for phase modulation.

Its transition-based nature enables Manchester encoding to overcome some of the limitations of level-based encoding, such as non-return to zero (NRZ) encoding, in which the value of each bit is determined by the signal value (amplitude or frequency, for example) over the bit period. Specifically, Manchester codes are "self-clocking" as the receiver detecting an incoming Manchester signal is able to detect and therefore utilize the mid-bit transition for reliable clock synchronization using a digital phase lock loop (DPLL) thus dispensing with the need for an additional clock input. This reliable clock recovery feature makes Manchester encoding well-suited for use with single-core transmission media such as optical fiber and coaxial cable. Additionally, the biphase nature of Manchester codes results in a balanced DC level across the signal.

Manchester codes are widely utilized in Ethernet and other networking architectures employing CSMA/CD. In order to detect the logic value of a Manchester encoded unit bit cell, conventional detectors/receivers sample and process a selected half of the bit cell, referred to herein as either the first or the second half-bit interval of the bit cell. The processed half-bit value can then be utilized to deduce the direction of the mid-bit transition as between two amplitude levels, frequency values, etc. A problem encountered with this signal detection technique is that only half, typically the second half, of each unit bit cell is processed for detection, resulting in half the received signal energy being wasted in terms of signal detection. Such half-bit detection results in a substantial reduction in the signal energy that is actually processed by the detector compared with the signal energy processed for a level-based signal detection in which the entire bit cell energy is processed during detection. The reduced received/processed signal energy results in an increased signal detection error rate and possibly the need for increased transmitter power.

It can therefore be appreciated that a need exists for an improved Manchester detector that utilizes the received Manchester signal energy more efficiently, resulting in a lower required transmission power and/or lower detector end bit error rate. The present invention addresses such a need.

SUMMARY OF THE INVENTION

A biphase code detector and method for implementing the same are disclosed herein. In accordance with one embodiment, the biphase code detector includes a receiver input for receiving a biphase encoded signal. The biphase encoded signal is a stream of unit bit cells each having a logic value encoded as a mid-bit transition between a first half-symbol signal component and a second half-symbol signal component. A demodulator demodulates the first and the second half-symbol components of a received unit bit cell. The biphase code detector further includes a delta detector that generates a difference signal corresponding to the difference between the demodulated values of the first and second half-symbol components to determine the logic value of the received unit bit cell. In a preferred embodiment, the biphase code detector incorporates the delta detection function within an optimum receiver that integrates demodulation and detection functionality. For a given received signal energy, the biphase code detector of the present invention results in an approximate 3 dB sensitivity increase in detector gain resulting in a lower probability of error and lower transmission power requirements.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Manchester encoded signals, referred to interchangeably herein as biphase encoded signals, are characterized as signals in which the binary data are encoded as mid-bit signal transitions rather than as "levels," such as amplitude, frequency and phase values within a bit cell. The present invention is directed to a device and method for improving the effective detector sensitivity when receiving Manchester encoded signals. Specifically, and as explained in further detail with reference to the figures, the present invention overcomes problems associated with conventional Manchester demodulators and detectors wherein only one half of a unit bit cell is used for detection in order to determine the direction of the mid-bit cell transition and thus the logic value of the bit. Consistent with conventional art field terminology, the terms "symbol" is used herein interchangeably with "bit" and "bit cell."

Figure 1:
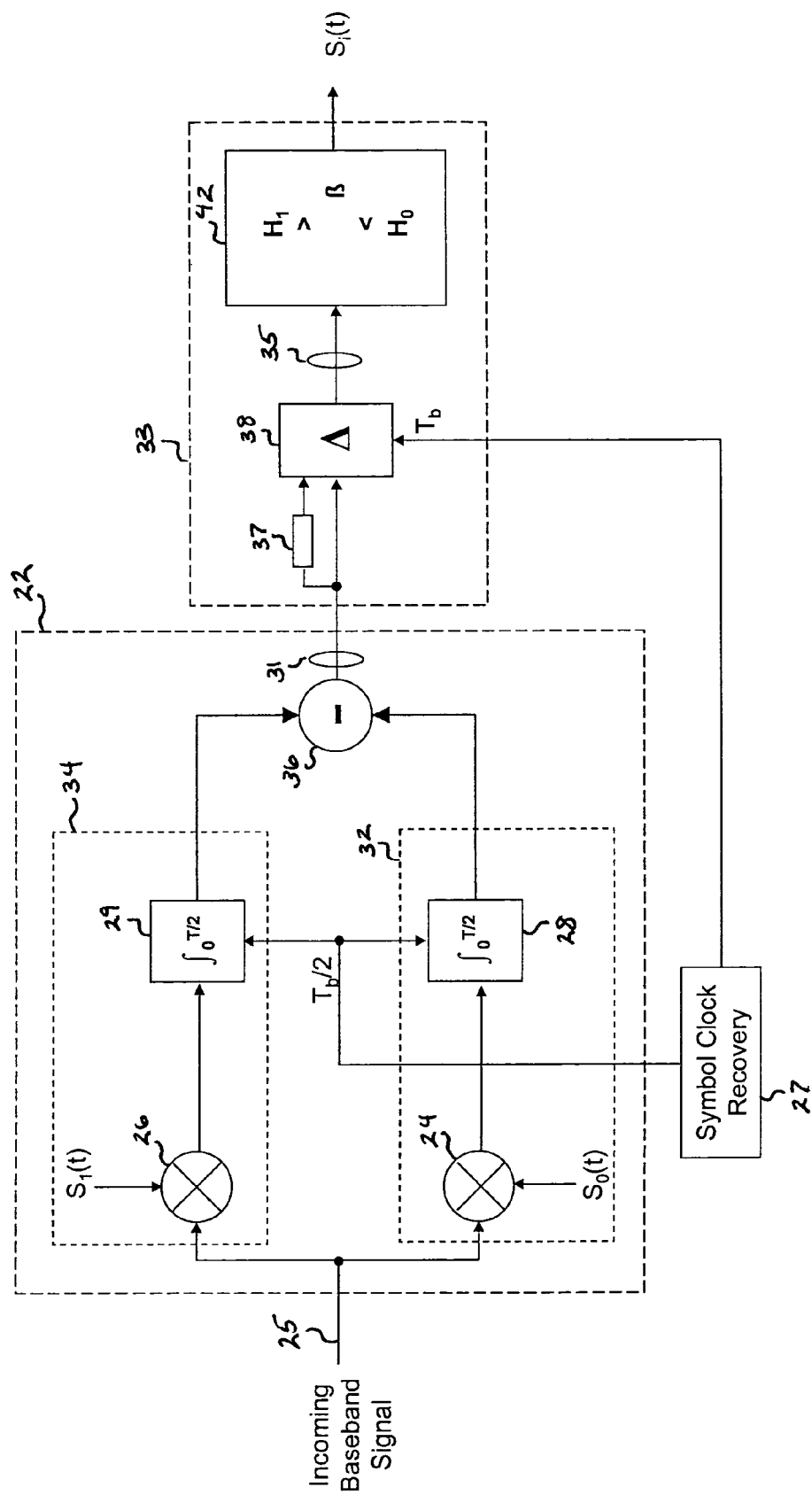
FIG. 1 illustrates an optimum receiver incorporating a biphase code detector in accordance with a preferred embodiment of the present invention.

With reference now to the figures, wherein like reference numerals refer to like and corresponding parts throughout, and in particular with reference to FIG. 1, there is illustrated an optimum receiver 20 incorporating a Manchester delta detector in accordance with a preferred embodiment of the present invention. As shown in FIG. 1, optimum receiver 20 includes a demodulator 22 that receives and demodulates a Manchester encoded baseband signal from an input signal line 25. In accordance with the present invention, the received Manchester encoded baseband signal may be modulated in accordance with well-known amplitude shift key (ASK), frequency shift key (FSK), phase shift key (PSK), hybrid, or other modulation techniques compatible with Manchester encoding. Regardless of the type of modulation utilized, and in accordance with Manchester encoding principles, each unit bit cell in the received baseband signal stream has a logic value encoded as a mid-symbol transition between the first half-symbol signal component and the second half-symbol signal component. Depending on the particular digital signal modulation technique employed, the first and second half-symbol components of each bit cell may assume the value of one of two complementary amplitude levels, frequency values, phase variations, etc. Each unit bit cell is therefore divided at its approximate midpoint by an amplitude, frequency or phase related signal transition dividing the first half-symbol signal component from the second half-symbol component. For ease and consistency of reference in the following description, the "first half-symbol component" refers to the signal value occurring over the first half of each unit bit cell, and the "second half-symbol component" refers to the signal value occurring over the second half, which in accordance with the Manchester encoding principles explained above, will always assume the complementary signal value as dictated by the mid-bit transition.

With continued reference to FIG. 1, the baseband signal carried over signal line 25 is received by demodulator 22 at the inputs of a pair of correlators 32 and 34 that each include signal multiplication and integration means designed to separate and smooth the complementary "level" signal values occurring over each of the half-bit intervals of each bit cell in the baseband signal. In accordance with well-known baseband signal correlation principles, a pair of multipliers 24 and 26 mix/multiply correlation signals $S_0(t)$ and $S_1(t)$, respectively, with the received baseband signal. The mixing of correlation signals $S_0(t)$ and $S_1(t)$ results in each of multipliers 24 and 26 effectively passing a correlated, or matching, half of each unit bit cell and effectively canceling the non-matching the other half-symbol component of the unit bit cell. As shown in FIG. 1, the output from multiplier 24 is passed to an integrate and dump device 28 while the output from multiplier 26 is passed to an integrate and dump device 29.

Integrate and dump devices 28 and 29 integrate the correlated outputs from multipliers 24 and 26, respectively, in accordance with well-known signal demodulation principles. Specifically, each of integrate and dump devices 28 and 29 samples and integrates the respective first and second half-bit interval components over a half-symbol period (i.e. half the full bit cell or symbol period) in accordance with the half symbol clock signal generated by a symbol clock recovery block 27. The clock signal generated by clock recovery block 27 is synchronized with the received baseband signal utilizing a digital phase locked loop (not depicted) in accordance with well-known Manchester clock recovery techniques.

The biphase nature of each Manchester encoded bit cell combined with the correlation criteria of multipliers 24 and 26, results in the first half-symbol component of a given bit cell being passed to one of integrate and dump devices 28 or 29 over the corresponding first half-symbol period, and the second half-symbol component being passed to the other integrate and dump device over the second half-symbol period. The integration performed by integrate and dump devices 29 and 28 on each of the separated half-symbol components serves a low-pass filtration function that smoothes undesired signal level variations introduced by noise.

Figure 3:
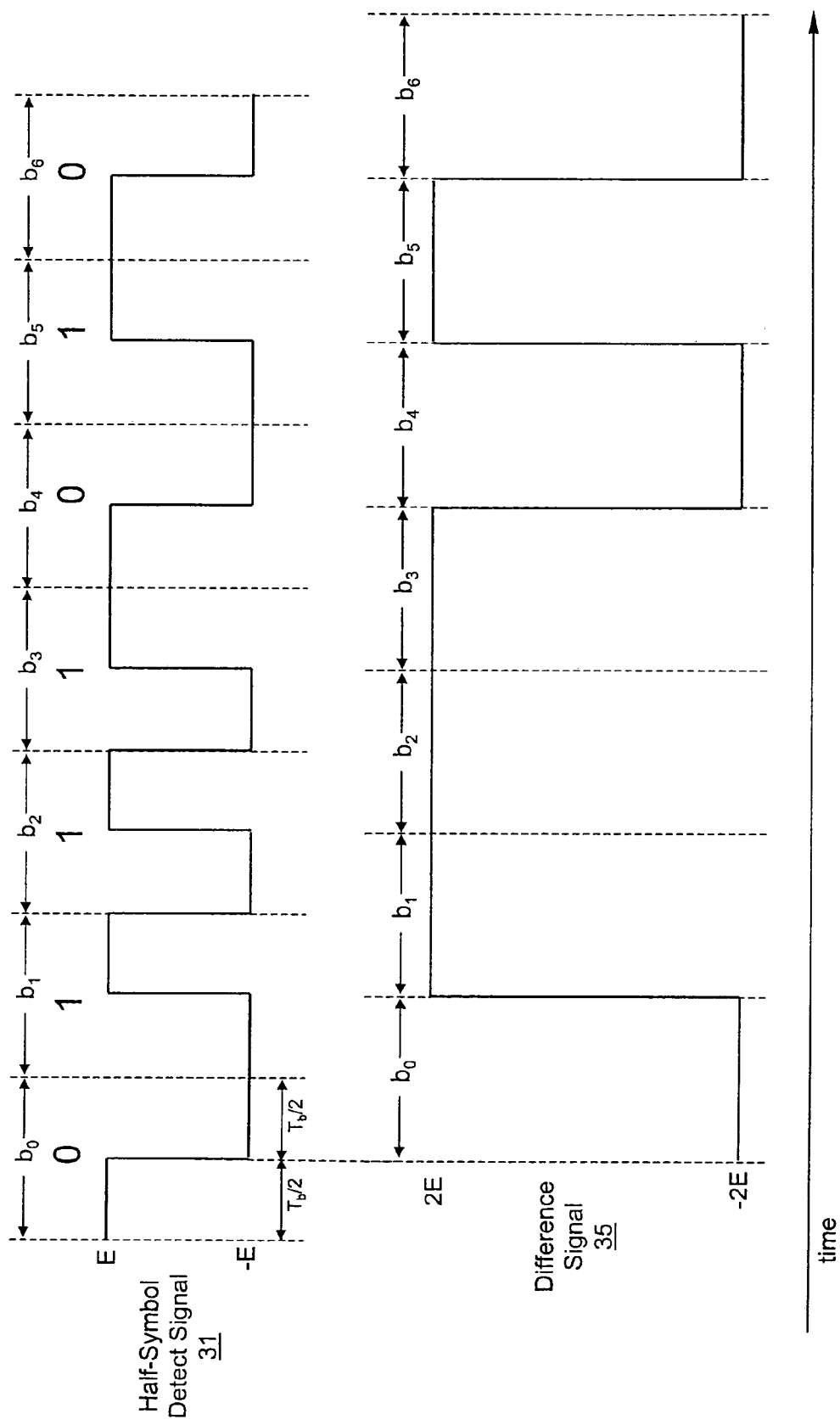
FIG. 3 is a signal diagram illustrating a simplified representation of a demodulated and corresponding post-demodulated difference signal in accordance with the present invention.

As further illustrated in FIG. 1, demodulator 22 also includes a half-symbol detector 36 for detecting and passing valid outputs from correlators 32 and 34. Specifically, half-symbol detector 36 detects and passes the integrated half-symbol signal components from the outputs of correlators 32 and 34. In a preferred embodiment, half-symbol detector 36 selectably detects a valid output from correlators 32 and 34 at each half-symbol period by subtracting the output of device 29 from the output of device 28, or vice versa. Assuming the former for example, when the first half-bit interval signal value of a given bit cell correlates to correlation signal $S_0(t)$, and is therefore integrated by integrate and dump device 28, half-symbol detector 36 subtracts the negligible noise value present at the output of integrate and dump device 29 from the valid correlated signal energy value received from device 28 over the first half-bit interval, resulting in a positive or negative signal value output from half-symbol detector 36 over the corresponding first half-symbol period. Given the biphase nature of the bit cell, the second half-symbol signal component of the same bit cell correlates to $S_1(t)$, and is therefore integrated by integrate and dump device 29, the result of which is subtracted from the negligible noise value present at the output of integrate and dump device 28, resulting in a negative signal energy value being output at output line 31 from half-symbol detector 36 over the second half-symbol interval. FIG. 3 illustrates a simplified representation of a demodulated signal 31 output from half-symbol detector 36 in which each of unit bit cells $b_0$ through $b_6$ includes demodulated first and second half-symbol signal components (represented in FIG. 3 as positive and negative amplitude levels).

In an important feature of the present invention, optimum receiver 20 further includes a delta detector 33 that processes the detected half-symbol components received from half-symbol detector 36. Delta detector 33 includes any combination of circuit means for generating a difference signal having a magnitude corresponding to the difference between the demodulated first and second half-symbol signal components of a given unit bit cell. The difference signal is generated at each unit symbol boundary by a half-symbol differentiator 38 that receives as inputs a delayed and an undelayed detected output from half-symbol detector output 31. In accordance with the depicted embodiment, a signal delay device 37, such as a delay line or the like, provides the delayed input into half-symbol differentiator 38, which subtracts the delayed signal from the undelayed signal, or vice versa, over full symbol period boundaries in accordance with the synchronized clock from symbol clock recovery block 27 such that the original transition-based Manchester signal is converted to a level-based encoded format.

In one embodiment, half-symbol differentiator 38 subtracts the detected second half-symbol component of each unit bit cell from the corresponding first half-symbol component. The resultant difference signal generated by half-symbol differentiator 38 delivered over half-symbol differentiator output 35 therefore includes signal energy sampled from the signal values processed by correlators 32 and 34 over the entire unit bit cell. As depicted in FIG. 3, the difference signal from differentiator output 35, delayed by a half-symbol period, has been decoded from the transition-based Manchester form to a level-encoded form. Furthermore, the difference signal value obtained from the subtraction of the detected half-bit interval values, will have a magnitude significantly greater than the individually detected half-bit values.

In accordance with the depicted embodiment, delta detector 33 further includes an output signal detector 42 that detects the decoded logic value of each bit cell by comparing the difference signal value generated by half-symbol differentiator 38 with a pair of threshold values, $H_1$ and $H_0$, corresponding to valid complementary logic values. Responsive to the difference signal on half-symbol differentiator output 35 meeting the threshold comparison, the signal is passed as an output signal $S_i(t)$ to a decoder or other subsequent processing devices.

It should be noted that the present invention is not limited to the specific means depicted in FIG. 1 for accomplishing the separation and integration of the logic level phase components of the unit bit cells in the Manchester signal stream. Although not depicted herein, those skilled in the art will readily appreciate and understand that analogous signal correlation can be accomplished using matched filter or Fast Fourier Transform (FFT) digital signal processing devices.

Figure 2:
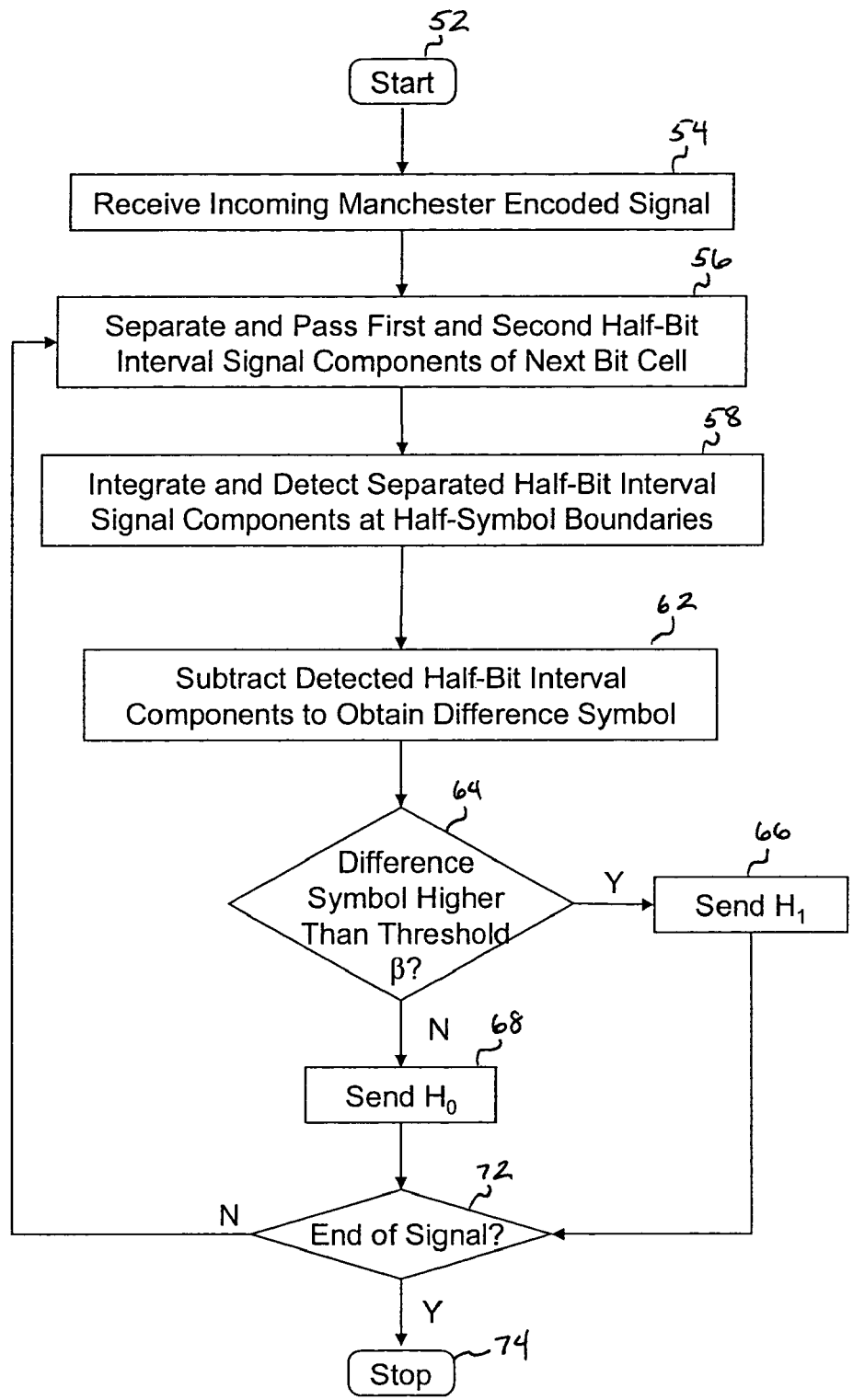
FIG. 2 is a flow diagram depicting steps performing during biphase code detection in accordance with a preferred embodiment of the present invention.

Referring now to FIG. 2, there is illustrated a flow diagram depicting steps performing during Manchester delta detection in accordance with a preferred embodiment of the present invention. The delta detection process begins as shown at step 52, and proceeds to step 54 with the Manchester encoded baseband signal being received at the detector/receiver front end. If the signal is received over an air interface, step 54 includes preliminary demodulation to acquire the baseband signal from the high-frequency modulated signal. Next, as depicted at step 56, demodulation processing begins with the first and second half-symbol components of each unit bit cell within the received baseband signal stream being separated at half-symbol boundaries in accordance with the optimum detector correlation or matched filter technique explained with reference to FIG. 1.

Proceeding to step 58, demodulation of a given unit bit cell is completed with the separated half-symbol components being sequentially integrated and detected at half-symbol boundaries using the integrate-and-dump and half-symbol detector devices illustrated in FIG. 1. The resultant demodulated signal is depicted in FIG. 3 as half-symbol detector output 31. Following demodulation and half-symbol detection, the first half-symbol component is delayed over a half symbol period in preparation for subsequent half-symbol differentiation from the corresponding second half-symbol signal component. In a preferred embodiment, the integrated value of the first half-symbol component is delayed one half symbol period using a delay line or similar device such as that depicted in FIG. 1. In a preferred embodiment, the difference signal 35 is obtained as illustrated at step 62 by subtracting the delayed first half-symbol component from the second half-symbol component over full symbol boundaries.

The subtraction of the integrated values of the first half of the bit cell from the second half results in a difference signal having an amplitude approximately twice that of an output signal resulting from integrating only one half of the Manchester encoded bit cell. This doubling in the output amplitude results in an increase of approximately 3 dB in effective detector sensitivity and bit error rate performance.

The process continues as depicted at step 64 with a determination by output signal detector 42 of whether the difference signal resulting from the subtraction at step 62 is within the valid output thresholds such that noise may be filtered from the receiver, as shown at steps 66 and 68. The process terminates at the end of the received signal stream as illustrated at steps 72 and 74.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

What is claimed is:

1. A method for detecting biphase encoded data comprising:

receiving a biphase encoded signal, the biphase encoded signal characterized as including unit bit cells each having a logic value encoded as a mid-symbol signal transition between a first half-symbol signal component and a second half-symbol signal component;

integrating the first half-symbol signal component of the unit bit cell over a half-symbol period to produce a first half-signal component value and integrating the second half-symbol signal component of a unit bit cell over a half-symbol period to produce a second half-signal component value; and generating a difference signal corresponding to the difference between the integrated values of the first and second half-symbol components, such that the difference signal is utilized to determine the logic value of the unit bit cell.

2. The method of claim 1, further comprising detecting the logic value of the received unit bit cell by comparing the difference signal with a validity threshold value.

3. The method of claim 1, wherein the received biphase encoded signal is a Manchester encoded signal.

4. The method of claim 1, wherein said biphase encoded signal is modulated as amplitude shift keyed, frequency shift keyed, or phase shift keyed.

5. The method of claim 1, wherein said step of generating a difference signal comprises subtracting the integrated first half-symbol signal component value from the integrated second half-symbol signal component value.

6. The method of claim 1, wherein said step of generating a difference signal comprises subtracting the integrated second half-symbol signal component value from the integrated first half-symbol signal component value.

7. The method of claim 1, further comprising the step of demodulating the first and second half-symbol signal components of the unit bit cell over sequential half symbol clock periods.

8. The method of claim 1, further comprising the step of correlating the first and second half-symbol signal components of the unit bit cell.

9. The method of claim 8, wherein said correlating step comprises separating the first and second half-symbol signal components of the unit bit cell.

10. The method of claim 1, further comprising the step of maintaining the positive or negative value of the first and second half-signal components.

11. The method of claim 1, wherein the step of integrating the first half-symbol signal component of the unit bit cell over a half-symbol period to produce a first half-signal component value and integrating the second half-symbol signal component of a unit bit cell over a half-symbol period to produce a second half-signal component value further comprises synchronization with a half symbol clock signal generated by a symbol clock recovery block.

12. The method of claim 1, wherein the step of generating a difference signal corresponding to the difference between the integrated values of the first and second half-symbol components, such that the difference signal is utilized to determine the logic value of the unit bit cell, is performed for each bit cell.

13. A biphase code receiver that receives a biphase encoded signal, wherein the biphase encoded signal is characterized as including unit bit cells each having a logic value encoded as a mid-symbol transition between a first half-symbol signal component and a second half-symbol signal component;

the receiver comprising:
 first and second integrator and dump devices, the first integrator and dump device integrating the first half-symbol component of the unit bit cell over a half-symbol period to produce a first half-signal component value and the second integrator and dump device integrating the second half-symbol component of the unit bit cell over a half-symbol period to produce a second half-symbol component value; and
 a half-symbol differentiator that generates a difference signal corresponding to the difference between the integrated values of the first and second half-symbol components, such that the difference signal is utilized to determine the logic value of the unit bit cell.

14. The receiver of claim 13, further comprising an output detector that compares the difference signal with a validity threshold value to determine the logic value of the received unit bit cell.

15. The receiver of claim 13, wherein said half-symbol differentiator comprises a subtractor.

16. The receiver of claim 13, further comprising means for correlating the first and second half-symbol components over sequential half-symbol clock periods.

17. The receiver of claim 16, wherein said correlation means further comprises:
 means for separating and passing the first half-symbol component and
 the second half-symbol component.

18. The receiver of claim 17, wherein said means for separating and passing comprise correlation multipliers.

19. The receiver of claim 13, wherein said first and second integrator and dump devices each maintain the positive or negative value of the first and second half-signal components.

20. The receiver of claim 13, further comprising a symbol clock recovery block that generates a half symbol clock signal to synchronize said first and second integrator and dump devices.

21. A method for detecting biphase encoded data comprising:
 receiving a biphase encoded signal, the biphase encoded signal characterized as including unit bit cells each having a logic value encoded as a mid-symbol signal transition between a first half-symbol signal component and a second half-symbol signal component;
 integrating the first half-symbol signal component of the unit bit cell over a half-symbol period to produce a first half-signal component value and integrating the second half-symbol signal component of a unit bit cell over a half-symbol period to produce a second half-signal component value, both in synchronization with a half symbol clock signal generated by a symbol clock recovery block;
 maintaining the positive or negative value of the first and second half-signal components; and
 generating for each bit cell a difference signal corresponding to the difference between the integrated values of the first and second half-symbol components, such that the difference signal is utilized to determine the logic value of the unit bit cell.

* * * * *